United States Patent [19]

Meisel

[11] Patent Number: 5,297,253
[45] Date of Patent: Mar. 22, 1994

[54] COMPUTER USER INTERFACE NAVIGATIONAL TOOL

[75] Inventor: Leslie M. Meisel, Fair Lawn, N.J.

[73] Assignee: Ehrlich Associates, Inc., Park Ridge, N.J.

[21] Appl. No.: 818,665

[22] Filed: Jan. 9, 1992

[51] Int. Cl.$^5$ .................................................. G06F 3/14
[52] U.S. Cl. ..................................... 395/160; 395/140; 395/159; 395/161
[58] Field of Search ............... 395/155, 156, 157, 159, 395/160, 161, 275, 140

[56] References Cited

U.S. PATENT DOCUMENTS

| | | | |
|---|---|---|---|
| 4,553,206 | 11/1985 | Smutek | 364/300 |
| 4,574,364 | 3/1986 | Tabata et al. | 364/900 |
| 4,821,211 | 4/1989 | Torres | 364/521 |
| 4,827,419 | 5/1989 | Selby, III | 364/443 |
| 4,899,292 | 2/1990 | Montagna et al. | 364/521 |
| 4,954,969 | 9/1990 | Tsumura | 364/521 |
| 4,992,972 | 2/1991 | Brooks et al. | 364/900 |
| 5,032,989 | 7/1991 | Tornetta | 364/401 |
| 5,041,967 | 8/1991 | Ephrath et al. | 364/200 |
| 5,122,972 | 6/1992 | Richards et al. | 395/157 |
| 5,179,654 | 1/1993 | Richards et al. | 395/157 |
| 5,191,645 | 3/1993 | Carlucci et al. | 395/159 |

Primary Examiner—Dale M. Shaw
Assistant Examiner—Fran R. Faller
Attorney, Agent, or Firm—Watov & Kipnes

[57] ABSTRACT

A navigational tool is disclosed for traversing information units stored in a memory of a computer system. The computer system has a monitor and a control device and operates according to a computer application program. The navigational tool has three modules. The first module independently tracks a path traversed by the computer system under the control of the application program through the memory which generates and organizes a sequence of nodes into a hierarchical representation of the path followed by the computer system through the memory. The second module displays the sequence of nodes on the monitor simultaneously with the display generated by the application program. The sequence of nodes is continuously and automatically updated as the computer system traverses the memory. The control device is used to select any one of the sequence of nodes displayed on the monitor. The third module uses this selection to redirect traversal of the computer system to the level of the memory represented by the selected node.

27 Claims, 7 Drawing Sheets

COMPUTER USER INTERFACE NAVIGATIONAL TOOL

FIELD OF INVENTION

The present invention is directed to a user interface for a computer and, more particularly, to a user interface that includes a navigational tool that gives users a visual representation of the path a user has taken through information stored in a computer memory.

APPENDIX

An Appendix is attached hereto and is part of the disclosure hereof. The Appendix of this patent document contains material which is subject to copyright. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Modern computer systems are utilized by users to perform specific tasks or to solve specific problems. Typically, the computer system is programmed to perform these tasks or solve these problems. Such a program is referred to as an application program. Application programs may include data base programs, multimedia knowledge base programs, word processing programs and spread sheet programs. Application programs provide a user with an interface to enable the user of the application program to communicate with the program, for example, to give commands to execute instructions and access information stored in memory. Examples of user interfaces include pulldown menus, highlighted command prompts, graphical icons and identifiable commands. An application program may include its own user interface or take advantage of another program that provides a user interface to be used in conjunction with the application program.

User interfaces may allow a user to access stored information in various ways. One method is to provide, on request, a list of all the topics or files available for use in conjunction with the application program. These topics or files may be listed in a certain order, for example, alphabetical order or order of creation. The user can then select which topic or file the user desires to access. A refinement of this method is to list only those topics or files in a subcategory specified by the user of the application program.

Another approach is to create a hierarchical structure containing menus and the information to be accessed. The user is shown on a computer screen a main menu of choices, each with sub-menus, which allows the user to move through the hierarchical menu/data structure until the relevant topic or file is displayed. For example, an application program may provide users with access to a knowledge base by displaying a main menu listing the broad topics covered by the knowledge base. Each broad topic then has a sub-menu listing more specific topics. The listings in a sub-menu may include further sub-menus or, if the topic is sufficiently refined, the information itself. When the desired topic is reached, the monitor will display a screen with the information on that topic. Where the information on the topic comprises more than one screen, the user is able to access that information using interface commands such as "page down" or "next" commands. The displayed topic, in addition to displaying information, may provide further choices to access subtopics of that topic. Often, the user also has the option of accessing a general index or a previous topic or menu from any displayed topic. For example, if a user is accessing information on a certain topic and wishes to access information about a more specific or less specific topic mentioned in the information currently displayed, the user has the capability of being able to instantly retrieve such information by giving the relevant command or series of commands.

Information which is accessed in a hierarchical fashion can be described as having a main menu at the top of the hierarchy, with nodes at a next level representing the various choices available from the main menu. Each node can be referred to as a sub-menu (having further nodes) or a series of units of information where each unit is displayed as required on a section of the computer screen (called a window). Certain units of information may also enable a user to choose other nodes in the hierarchy with related information.

The units of information may be screens of knowledge taken from a knowledge base, comprising text, graphics, animation, audio, and video.

A problem users encounter when utilizing a hierarchial data structure to access information in complex systems is tracking where in the hierarchy the information currently displayed is located. When a user is confused about his or her location in the structure, the user is unable to take full advantage of accessing more specific or less specific or related information, because the user cannot determine what information is available for review and how that information can be accessed. The user may have the option of accessing a general alphabetical index or returning to the main menu and accessing the information by moving to the desired information through the hierarchical structure, but doing so is inefficient and is not an effective use of the data structure. The advantage of having related information accessable from the display is lost if the user must keep leaving the hierachical data structure to access the related information. The user must leave the screen of information to access the index and then return to the hierachical data structure to access further information. If the user must keep leaving the hierachical structure to find and access related data, the advantage of using the hierachical data structure is lost. Further, the user may wish to return to a screen previously displayed containing more general information or a screen higher than the current screen in the data structure hierarchy. If the user is unsure of the name of the screen or where that screen is located relative to the current screen of information, this will be a difficult task to accomplish. Even if the user remembers such information, returning to that screen often involves the user having to give a complex series of instructions.

Specialized high level languages and software applications have attempted to address the foregoing problems encountered by users by designing suitable user interfaces that allow a user to see the structure of the information or access information in non-sequential way. One such type of user interface involves instructions that cause a listing of the file names or screen names available to the user and describing which of those the user has previously accessed to be displayed on the screen. This system, however, does not provide a representation to the user showing the hierarchical structure of the information and the path by which the user has progressed through this hierarchy. The user is unable to determine from such a listing where the current screen of information is located in the hierarchy.

A second type of user interface designed to address the foregoing problem involves displaying miniature representations of the screens that the user has accessed in the past in the order that the user has accessed them. The user can then see the sequence of screens viewed prior to the current screen of information and can decide to return to a previous screen by selecting that screen using an input-output device such as a mouse. The miniature representations are displayed on a separate screen generally replacing the current screen of information. This type of user interface also does not show the hierarchical structure of the information being accessed. All screens are displayed in a linear fashion and the user has no knowledge of the level in the hierarchy at which each miniature screen is located or the level of one screen of information in relation to other screens.

A third type of user interface available, often used in accessing a knowledge base, is the use of a back-track icon that allows a user to retrace previous steps through the knowledge base. The user chooses the back-track icon which then causes the screen of information previous to that which the user is currently accessing to be displayed. Through the repetitive use of the back-track icon, a user can then retrace the steps taken through the knowledge base until the required screen is displayed. However, this method does not provide a visual display of the hierarchical structure of the information that is available. The user at any particular stage of operation would be unsure where in the hierarchy the current screen of information is located. Access to any prior screen of information can not be done instantaneously as all intermediate screens must be traversed.

When using a separate application program, such as a knowledge base described above, accessing the record of the user's path through the information structure generally requires leaving the knowledge base, accessing the record of the user's path and then returning to the knowledge base to obtain the further required information.

A further type of interface available is a "map" showing the structure of the whole, or a portion, of the knowledge base or file system. A disadvantage of using the map is that the user must leave the current location in the knowledge base or file system to view the map. The map replaces the information the user was accessing. The user must then return to the knowledge base or file system to obtain further information. Moreover, if the knowledge base or file system is complex, the map is either too large to fit on one screen, or if modified to do so, is not sufficiently detailed to be helpful to the user in accessing all the information.

Previous user interfaces do not continuously display where the user is located in a hierarchical information structure with that display also providing direct access capability to other parts of the hierarchical information structure.

In those cases where a record of the user's sequence through the information structure is maintained, the record is not continuously and automatically updated allowing the user to carry on, at the same time, the operation of the application program. Where such a record is maintained, it must be specially accessed and the record does not give information as to the hierarchical structure of the information.

SUMMARY OF THE INVENTION

The present invention provides a user interface with a navigational tool to allow a user to access stored information using graphical representations. The user interface shows a continuous and automatically updated visual representation of the hierarchical structure of the information accessed and allows a user to use the visual representation to access information in the hierarchy. The visual representations shown to the user can be related to the topics and sub-topics of the information which the user is familiar with rather than being related to the way the information is stored in memory. In addition, the invention provides information on the number of units of information in each node of information. Further, the user is able to access the hierarchy using various techniques. These methods of accessing the information are integrated with certain special programming features related to the information supplied by the application program and with the visual representation of the hierarchical structure of the information in one navigation panel.

The present invention divides a computer's monitor screen into two parts, a main window called the information screen used to display the actual information and associated menus specific to that information, and a second window, called the navigation panel, used to display graphical objects, called icons, which represent the user's current position in the information hierarchy. A user can manipulate the icons with an input-output device such as, for example, a mouse to navigate through the information hierarchy. The icons can be named and related to the topics the user is familiar with rather than the directory structure used by the operating system.

The navigation panel itself is divided into three segments. A first segment of the panel is used to display graphical icons representing each node in the information base that the user has accessed to reach the node representing the information currently displayed in the information screen. The first node icon displayed in the navigation panel is the node icon representing the main menu of the information hierarchy. The node icon displayed immediately adjourning the first node icon is the node next accessed by the user. It represents the sub-menu or one of the units of information accessed by the user from the main menu. As the user progresses further through the information hierarchy, a node icon representing each level in the hierarchy accessed by the user is displayed. The last node icon displayed is the node icon representing the current information displayed on the information screen.

The first segment of the panel window, which provides a continuously updated graphical reminder of the user's path through the information hierarchy by displaying a sequence of icon's representing each node accessed by the user, can be used to move to other sections of the information hierarchy. Each node icon can be selected by the user to move directly to that node and display the information represented by the node icon on the information screen without the user having to exit the application program. When a user selects a node icon, for example by clicking a button on a mouse with the cursor pointing to the node icon, the information screen displays the information represented by the node icon selected by the user. By doing so, the user is able to directly select any level in the information hierarchy between the first level (which is the user's entry point) and the level at which the user is currently located.

When there is a change of level in the information hierarchy, the first segment of the navigation panel is immediately updated. In that way, the display of the user's path through the information hierarchy is always up to date, with the last node icon being that representative of the information currently displayed on the information screen.

One way a user can move to a deeper level in the information hierarchy is by selecting the appropriate option in a menu. The menu is generally located in the information screen. Each screen of information can have its own menu listing which nodes at a lower level a user may select. The menu choices may be in the form of icons, menu bars on pull down menus or other such defined and identified areas on the information screen. When a deeper level is selected, the first segment of the navigation panel is immediately updated to show this selection as the last node icon, it now being the currently displayed information on the information screen.

A second segment of the navigation panel comprises navigational tools, in the form of graphical icons, that permit the user to move in a linear manner within each node. When it is possible to move to other units of information for the same node, Next or Previous icons or both are available. The Next icon or Previous icon (or both) are highlighted when there is more information on the subject being displayed in a subsequent or previous unit of information of the current node, respectively. To assist in the use of the Next and Previous icons, the first segment of the navigation panel also provides information on the number of units of information for the node displayed. By using the Next and Previous icons, the user is able to access those related units of information.

A third segment of the navigation panel displays graphical icons used to run special programming features associated with the information that is currently displayed on the information screen. For example, there may be displayed a help icon to provide help information, a graphic icon to produce on the screen graphical information to further explain a point made on the current information screen, a source icon to display the source of the information displayed on the current information screen, a play movie icon to play an animation related to information on the current information screen, a quiz icon to quiz the user about information seen on the current information screen. Which icons are available depends upon the application program and the information currently displayed on the information screen. Selecting an icon in the third segment will cause new information to be displayed on the information screen, and thus, the first segment will be updated by adding a node icon representing this screen. Further, within the third segment, an index icon identifies which mechanism the navigation panel is using to access information, for example, an index mechanism or a browse mechanism, as explained immediately below.

Nodes in the information base can be accessed using two mechanisms, the browse mechanism and the index mechanism. The browse mechanism provides access to information by traversing a regular path through the hierarchy of nodes. For example, a node of level three would be accessed when using the browse mechanism by traversing through nodes at level one and at level two. The node icons in the first segment of the navigation panel can also be selected when using the browse mechanism to access in a non-sequential way previously viewed units of information.

The index mechanism enables direct access to any node in the information hierarchy by presenting the user with a listing (generally alphabetical) of all "topics" in the information hierarchy. The user can then directly access any one of these topics by selecting the required topic from the index displayed on the information screen. When the user selects the index icon, the index of topics is displayed on the information screen and the first segment of the navigation panel is updated adding a node icon representing the index of topics as the last node icon. The user may then select a topic from the index or, as always, a previously accessed node from the first segment of the control panel. If the user selects a topic from the index, the index mechanism is activated. This causes the topic selected to be shown on the information screen and causes the sequence of node icons in the first segment of the control panel to be replaced by a new sequence of node icons, with the first node icon now representing the index. The first segment will display node icons representing the levels of information accessed by the user since engaging the index mechanism. Thus, when using the index mechanism, the first segment of the navigation panel provides a graphical representation of the user's position in the hierarchy relative to the index listing, and provides selection capabilities parallel to those when using the browse mechanism. If the user selects the first node icon (representing the index), then the browse mechanism will be resumed, the index listing will be displayed on the information screen, and the first segment of the navigation panel will display the sequence of nodes previously displayed before the index mechanism was engaged. The index icon thus provides the user with a facility to change between the browse access mechanism and the index access mechanism and to give a visual indication of the mechanism currently in use.

DETAILED DESCRIPTION

Figure 1:
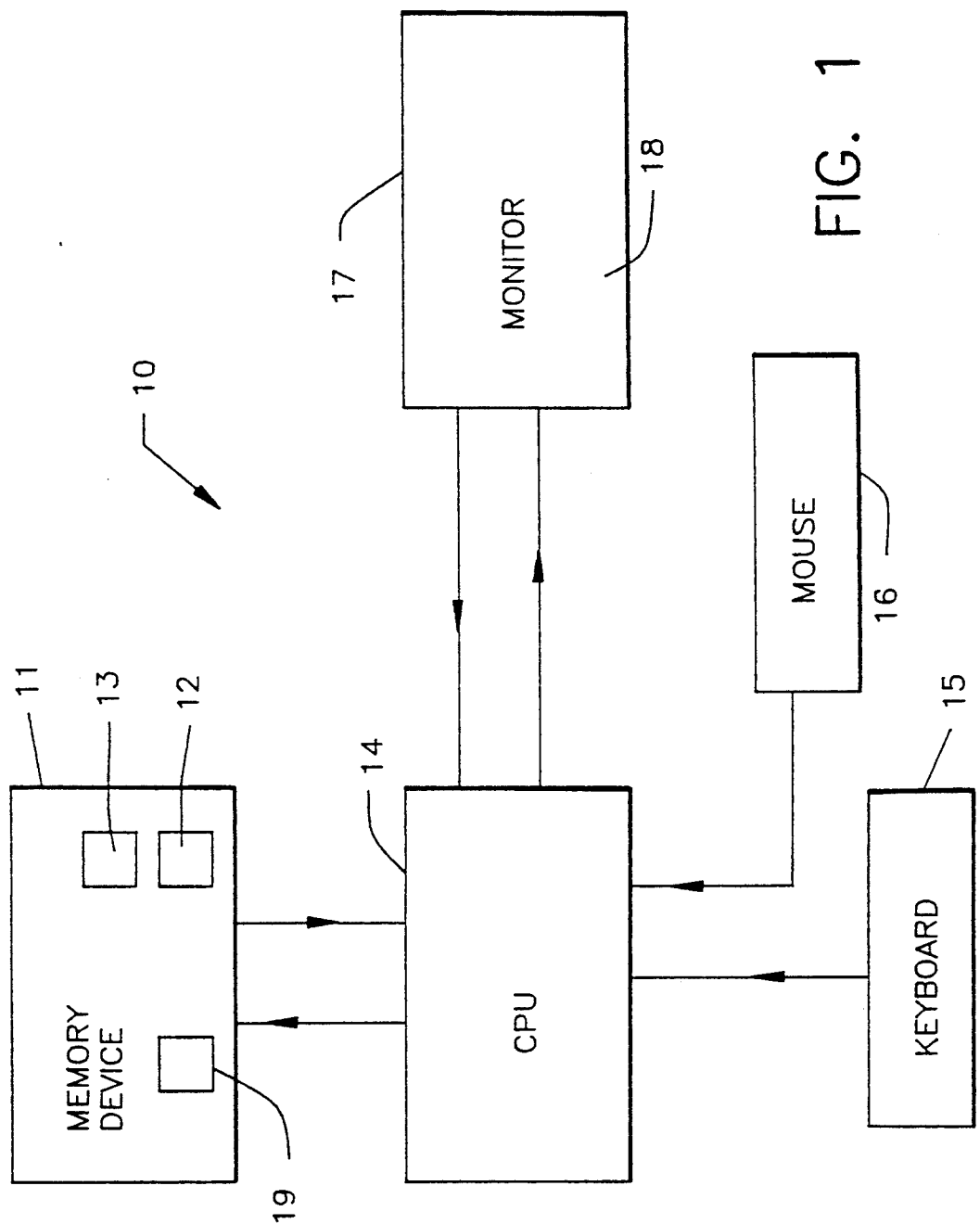
FIG. 1 is a block diagram of an exemplary computer system incorporating the navigational tool of the present invention.

Referring now to the drawings, and initially FIG. 1, there is illustrated in block diagram form an exemplary hardware environment 10, including illustrative input-output devices, which are used in the operation of the present invention. A memory device 11 stores an information base 12, the navigational tool module 19 of the present invention and an application program 13. The information base 13 could be a knowledge base, a file system, a data base, a multimedia knowledge base. The central processing unit (CPU) 14 is used to execute the application program 13 which in turn accesses, when required, the information base 12. Instructions are given to the CPU 14 to operate the application program 13 via input-output devices such as, for example, a keyboard 15 or a mouse 16. When running the application program 13 the CPU 14 causes a screen display 18 representing information in the information base 12 and the user interface display generated by the navigational tool module 19 to be displayed on the monitor 17. The user interface display is manipulated by the input-output devices 15 and 16 to cause the CPU 14 to operate the application program 13 and to access the information base 12.

Figure 2:
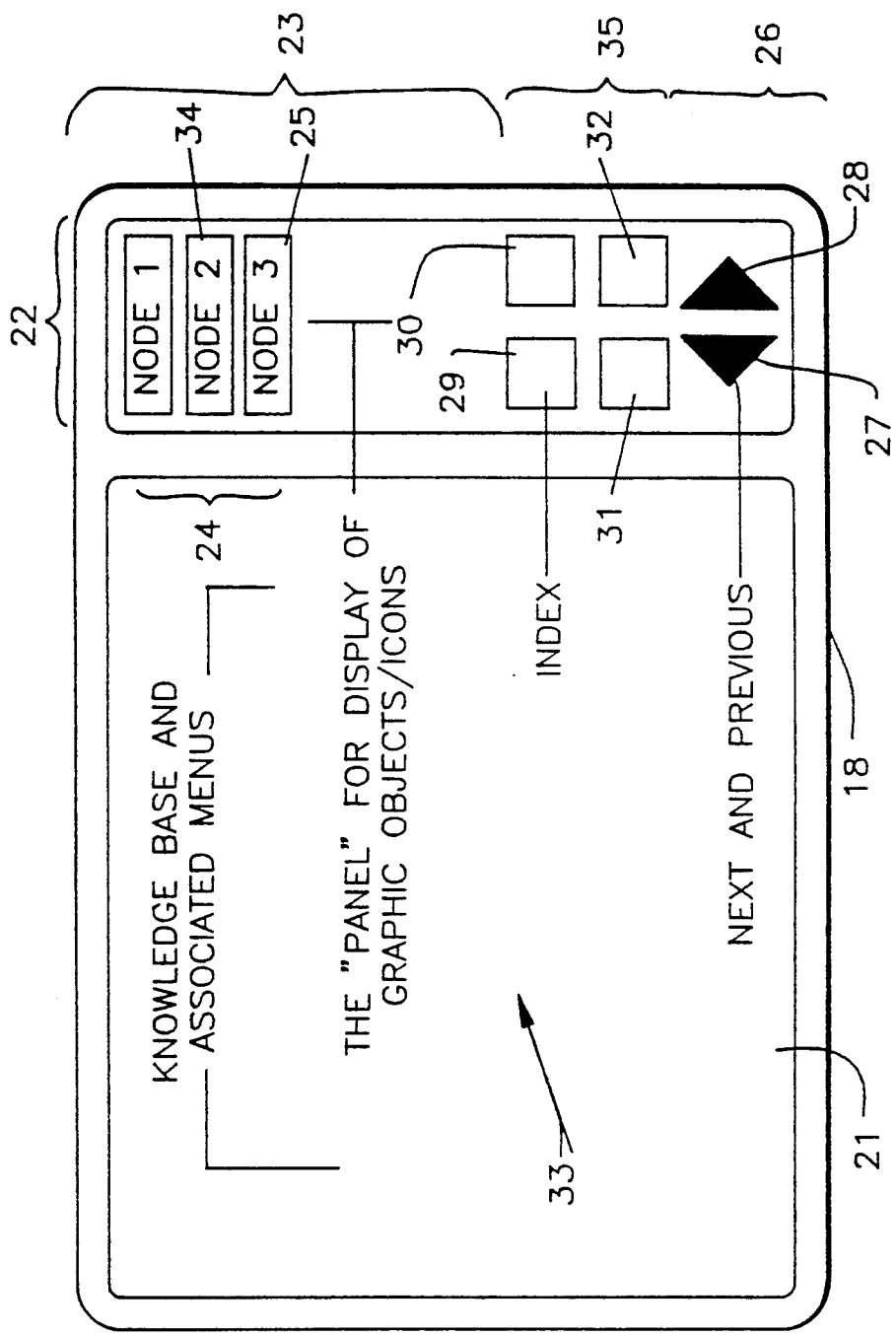
FIG. 2 is a diagram showing various segments of an exemplary screen display on the monitor of FIG. 1.

Referring now to FIG. 2, there is illustrated the division of the screen display 18 in various segments generated by the navigational tool module 19 of FIG. 1. Reference is also made in the following description to the information base 12 and application program 13 of FIG. 1, in relation to screen display 18. The screen display 18 is divided into two sections 21 and 22. The first section, referred to as the information screen 21, displays the contents of the information base 12 and associated menus specific to the operation of the information base 12. The second section is referred to as the navigation panel 22, is itself segmented into three segments 23, 26 and 35. The first segment 23 displays a sequence of icons 24 providing a graphical display of the user's path through the information base 12. The sequence of icons 24 displayed represents the user's position in the information base 12 relative to the user's entry place into the information base 12 (when using a browse mechanism as explained below) or relative to an index (when using the index mechanism as explained below). Each node icon 34 represents a level of information in the hierarchical structure of the information base 12. FIG. 2 shows as an example three node icons 34 in the sequence of icons 24. The number of node icons 34 in the sequence of icons 24 depends upon the user's position in the information base 12. The last node icon 34 in the sequence of icons 24, called the current node icon 25, represents the current information displayed on the information screen 21.

The current node icon 25 can display, when required, the number of units of information available at that level for that node. Moreover, the number of the unit of information currently displayed on the information screen 21 is shown. The other node icons 34 in the sequence of icons 24 display the name of the topic represented by the node icon 34 and display the hierarchy of topics from the entry point in the information base 12 to the current node icon 25.

The second segment 26 of the navigation panel 22 displays further navigational icons that cause a change in the display on the information screen 21 but not a change in level in the hierarchy. A Next icon 28 and a Previous icon 27 are displayed whenever there is more information in the information base 12 on the topic currently displayed on the information screen 21 subsequent or previous, respectively, to the unit of information represented by the current node icon 25.

The third segment 35 of the navigation panel 22 contains further icons 29–32 relating to the access mechanism and certain special programming features.

The present invention supports two mechanisms to allow a user to access the information base 12. These are an index mechanism and a browse mechanism. When the user selects the index mechanism, by means of selecting index icon 29, the user is shown a listing of all topics of information available in the information base 12. The user is able to select from this list and access the information directly. The navigation panel 22 is shown with the current icon 25 representing the index. If the user selects from the index list, the index mechanism is activated. The first segment 23 of the navigation panel 22 will then show a new sequence of icons 24 beginning with node icon 34 representing the index listing. The first segment 23 of the navigation panel 22 will thus provide a graphical representation of the user's position in the hierarchy relative to the index listing. The user may resume the browse mechanism by selecting the node icon 34 representing the index listing at the beginning of the sequence of icons 24, causing the sequence of icons prior to activating the index mechanism to reappear on the first segment 23 of the navigation panel 22 and the index listing to be displayed on the information screen 21. The browse mechanism allows the user to select further screens of information by selecting a node icon 34 in the navigational panel 22, a further topic referred to on the information screen 21 or other icons in the third segment 35 of the navigation panel 22. Again, once the topic is selected, the navigation panel 22 is updated. The index icon 29 also identifies the current mode of operation the present invention.

Further icons such as a help icon 30, a graphic icon 31, and a source icon 32 can also be displayed in the third segment 35 of the navigation panel 22 as required by the application program 13 or information base 12. These icons represent instructions that can be carried out by the application program 13 specific to the information currently displayed on the information screen 21. FIG. 2 shows four icons 29, 30, 31 and 32 as examples of the icons that can be displayed in the third segment 35. The numbers and types of icons displayed in the third segment 35 depends on the application program 13 and information base 12 in use. For example, the help icon 30 when selected will cause help information to be displayed on the screen display 18. The graphic icon 31 when selected will display graphical information about the information currently displayed on the information screen 21. The source icon 32 when selected will display the source of the current information. The functions and numbers of the icons in this area vary and depend upon the application program 13 and the information base 12. When an icon in the third segment 35 is selected, which results in a change of information nodes the first segment 23 of the navigation panel 22 is updated to show the selection as the current node icon 25. The user may return to a previous screen by using the sequence of icons 24 as explained below.

The user communicates with the interface by means of a pointing device shown on the screen display 18, referred to as a pointer 33. The movement of the pointer can be controlled by devices such as the mouse 16 (FIG. 1), a trackball (not shown), a light pen (not shown), a touch sensitive screen (not shown), a keyboard 15 (FIG. 1) or voice activated control (not shown). The pointer 33 is used to select the required icon. While the pointer 33 is placed upon an icon, and the icon is selected by the user, for example by clicking a button on the mouse 16 (FIG. 1), the action which the icon defines is selected. Actions include displaying information on the information screen 21, changing the access mechanism, and executing instructions.

For example, if the Previous icon 27 is selected, a unit of information, at the same level in the information hierarchy and belonging to the current node icon 25, previous to the unit of information currently displayed is displayed on the information screen 21. If the Next icon 28 is selected, the unit of information, at the same level in the information hierarchy and belonging to the current node icon 25, subsequent to the unit of information currently displayed is displayed on the information screen 21. Neither of these actions causes a change in level or in nodes in the information base hierarchical structure. However, the current node icon will display the number of the unit of information to reflect the number of the unit of information shown on the information screen 21.

When the pointer 33 is placed upon one of the icons in the third segment 35 of the navigational panel 22 such as the help icon 30, graphic icon 31 or source icon 32, and that icon is selected, the relevant action which may be a special programmed routine or the display of other information relevant to the current display on the information screen 21 is carried out.

If the pointer 33 is placed on one of the node icons 34 in the sequence of icons 24 in the first segment 23 of the navigation panel 22, and that node icon 34 is selected, then the information screen 21 displays the information (which could include a menu or sub menu) represented by the selected node. The first segment 23 of the navigation panel 22 is then modified to display the current state of the user's path through the information base 12 by modifying the sequence of icons 24 so that all node icons lower in the hierarchy than the selected node icon 34 are removed from the display. Node icon 34 than becomes the current icon. In that way, the series of icons 24 provides a current pictorial representation of the user's path through the information base 12. Selection capabilities using the sequence of icons 24 are available when using both the browse mechanism and the index mechanism.

When the pointer 33 is placed on an icon for a period of time but that icon is not selected, information determined relevant by the application program 13 is displayed on the screen display 18. The state of the information base 12 remains the same. When the pointer 33 leaves the icon, the information is hidden, i.e., no longer displayed.

Figure 3:
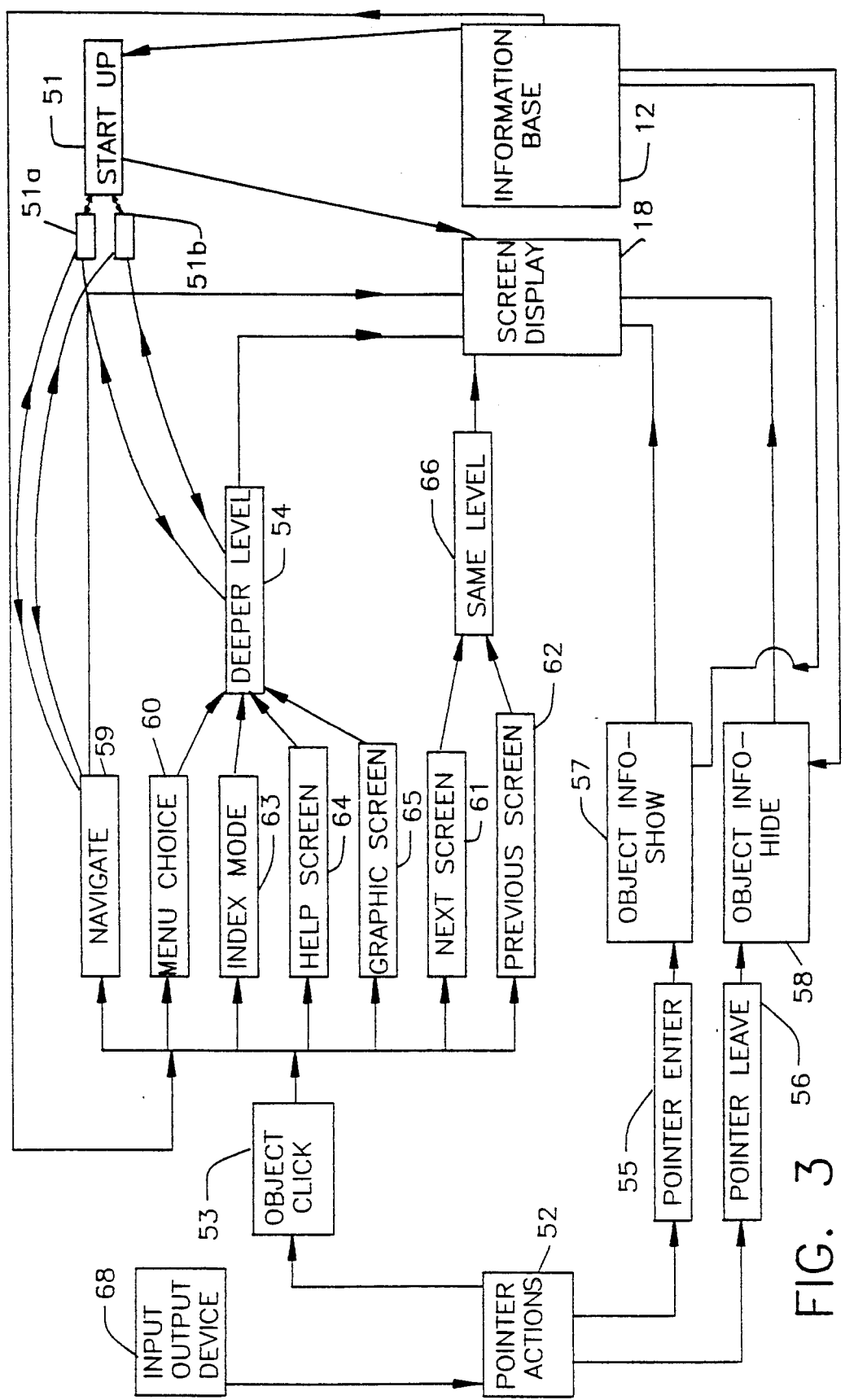
FIG. 3 is a structural chart illustrating the process flow of the navigational tool of the present invention.

Referring now to FIG. 3 there is illustrated a structural chart showing the process flow between various modules of the present invention and certain hardware devices of FIG. 1 and FIG. 2.

Each separate function of the present invention is carried out by a module. Each module, when finished its function, may then in turn call another module. Each module is implemented in software. The Appendix contains an exemplary embodiment of the software used to implement the modules shown in FIG. 3.

As an example of the operation of the present invention, a user may require a process to be carried out by the application program 13. When the user commences operation of the application program 13, the startup module 51 of the present invention is activated. The startup module 51 accesses the information base 12 related to the application program 13 and causes to be displayed on the monitor 17 the information screen 21 and the navigation panel 22. In the navigation panel 22, the node icon 34 representing the level of entry to the information base 12 (generally the main menu) is displayed. The startup module 51 initially sets the current level in the information hierarchy at level one and selects the browse mechanism as the access mechanism. Thus, the top segment 23 of the navigation panel 22 only shows one node icon 34. This node icon 34 represents the user's entry point into the information base 12. The startup module 51 opens two arrays. The first array, called the pathList array 51a, is used to store the collection of screen names visited when using the browse mechanism. The second array, called the indexList array 51b, stores the collection of screen names visited when using the index mechanism.

The user selects different icons or menu commands from the screen display 18 by moving and activating the pointer 33 as required. The pointer is moved and activated by an input-output device 68, such as the mouse 16. A pointer actions module 52 determines what type of command the user is giving by examining the position of the pointer 33 on the screen display 18. The position of the pointer 33 defines what actions the user wants to be taken. The pointer actions module 52 determines where on the screen display 18 the pointer 33 is located. The pointer actions module 52 then calls the module related to the icon or menu command given by the user.

When an icon in the navigation panel 22 is selected by the user, an objectclick module 53 is activated by the pointer actions module 52. When the pointer 33 is located in the information screen 21 and an icon there representing access to a subsequent level is selected, the objectclick module 53 is also activated by the pointer actions module 52. When the pointer 33 is placed over an icon for a specified period of time, a pointerEnter module 55 is activated by the pointer actions module 52. When the pointer is removed from that icon, a pointerLeave module 56 is activated by the pointer actions module 52.

The pointerEnter module 55 causes information to appear on the screen display 18 temporarily. When the pointer 33 is placed over an icon, the pointerEnter module 55 waits a preselected time to determine if the positioning is deliberate. After waiting the preselected period of time, the pointerEnter module 55 checks to see if the pointer 33 is still located on the icon. If the pointer 33 is still located on the same icon, the pointerEnter module 55 will issue an objectInfoShow message causing an objectInfoShow module 57 to be activated.

The objectInfoShow module 57 determines, by examining the icon on which the pointer 33 is located, which message to display. If there is information concerning the icon in the information base 12, then that information is displayed on the information screen 21.

When the pointer 33 leaves an icon, the pointerLeave module 56 issues an objectInfoHide message activating an objectInfoHide module 58. The objectInfoHide module 58 determines if any information is being displayed by the objectInfoShow module 57 on the particular icon that was just left by the pointer 33. If information on that icon exists in the information base 12 and was displayed, then the objectInfoHide module 58 causes that information to be hidden from view, i.e., not displayed on the screen display 18 any longer so that the information before the objectInfoShow module 57 was activated is again displayed.

If an icon is selected which is inside the navigation panel 22 or is a menu choice on the information screen 21 to change the display of the information screen 21 then the objectclick module 53 determines which module to activate next. FIG. 3 shows examples of seven modules that can be activated by the objectclick module 53. When a node icon 34 in the first segment 23 on the navigation panel 22 is selected by the user, then a navigate module 59 is activated. If the Next icon 28 or Previous icon 27 is selected, then a next screen module 61 or a previous screen module 62, respectively, is activated. If the index icon 29 is selected, then the index listing is displayed on the information screen 21 and if one of the index listings is selected, an index mode module 63 is activated. If one of the other icons in the third segment 35 is selected, then the relevant module is activated. Examples shown in FIG. 3 are the help screen module 64 which activates a help screen and a graphic screen module 65 which operates a graphic screen. When an icon or menu bar in the information screen 21 is selected to cause a change to the next level of operation in the information base 12, a menu choice module 60 is activated.

The navigate module 59 controls the display of the sequence of nodes 24 and the display of a new screen on the information screen 21 when one of the sequence of nodes 24 is selected. The navigate module 59 first determines whether the user is using the browse mechanism or the index mechanism. If the browse mechanism is in use, then the navigate module 59 tests to see if the level which is represented by the node icon 34 on which the pointer 33 is placed when activated is less than the current level displayed on the information screen 21. If the level selected is less than the current level, the navigate module 59 removes the relevant node icons 34 from the sequence of nodes 24 so that the selected node icon 34 is the current node icon 25. The relevant screen names are also removed from the pathList array 51a. The navigate module 59 uses the pathlist array 51a to display the information on the information screen 21 representative of that node icon 34. The level of operation is set at the level of the node icon 34 selected. If the user is using the index mechanism, parallel operations take place in relation to selecting and displaying a new node on the navigation panel 22. The index mechanism allows the user direct access to any information screen stored in the information base 12. The relevant screen names are added to or removed from the indexList array 51b.

If the next screen module 61 is activated by the objectclick module 53, the next screen module 61 issues a message to indicate a change in screen to a unit of information at the same level as that of the current node icon 25 but subsequent to the unit of information shown on the information screen 21. A samelevel module 66 is activated.

The previous screen module 62 operates in a similar fashion to the next screen module 61 except that the unit of information selected is the unit of information previous to that shown on the information screen 21. The samelevel module 66 is called by the previous screen module 62 and the next screen module 61 whenever there has to be a change in the information screen 21 by displaying a unit of information belonging to the same node. If the user has selected the browse mechanism, then the name of the icon on the navigation panel 22 representing the current node icon 25 is set to the name of the current screen. The name of the current screen is stored in the pathList array 51a. If the user has selected the index mechanism, a similar process occurs except that the indexList array 51b is used.

A menuchoice module 60 is activated when a menu item or icon in the current information screen 21 is selected. The menuchoice module 60 causes the new screen to be displayed. When the new screen is a sub-menu or information at a level lower than that of current screen, the menuchoice module 60 issues a command to activate a deeperlevel module 54. The deeperlevel module 54 updates the display of the sequence of icons 34 in the navigation panel 22. Because there is a change of screen and a change of node, the deeperlevel module 54 increases the current level by one. An additional node icon 34 in the top segment 23 of the navigation panel 22 is added representing the new screen. That node icon 34, being the node icon 34 representing the currently displayed information, will be the current node icon 25. If using the browse mechanism, the pathList array 51a is updated. If using the index mechanism, the indexList array 51b is updated.

The selection of an icon in the third segment 35 of the navigation panel 22 will also cause the activation of the deeperlevel module 54. For example, selection of the help icon 30 will cause the objectclick module 53 to activate the helpscreen module 64. The helpscreen module 64 will change the information screen 21 so that it displays the relevant help information. As there has been a change in level, the deeperlevel module 54 is then activated and the first segment 23 of the navigation panel 22 is updated showing the help screen as the current node icon 25. A user can return to previous screens by selecting a node icon 34 from the navigation panel 22.

Figure 4A:
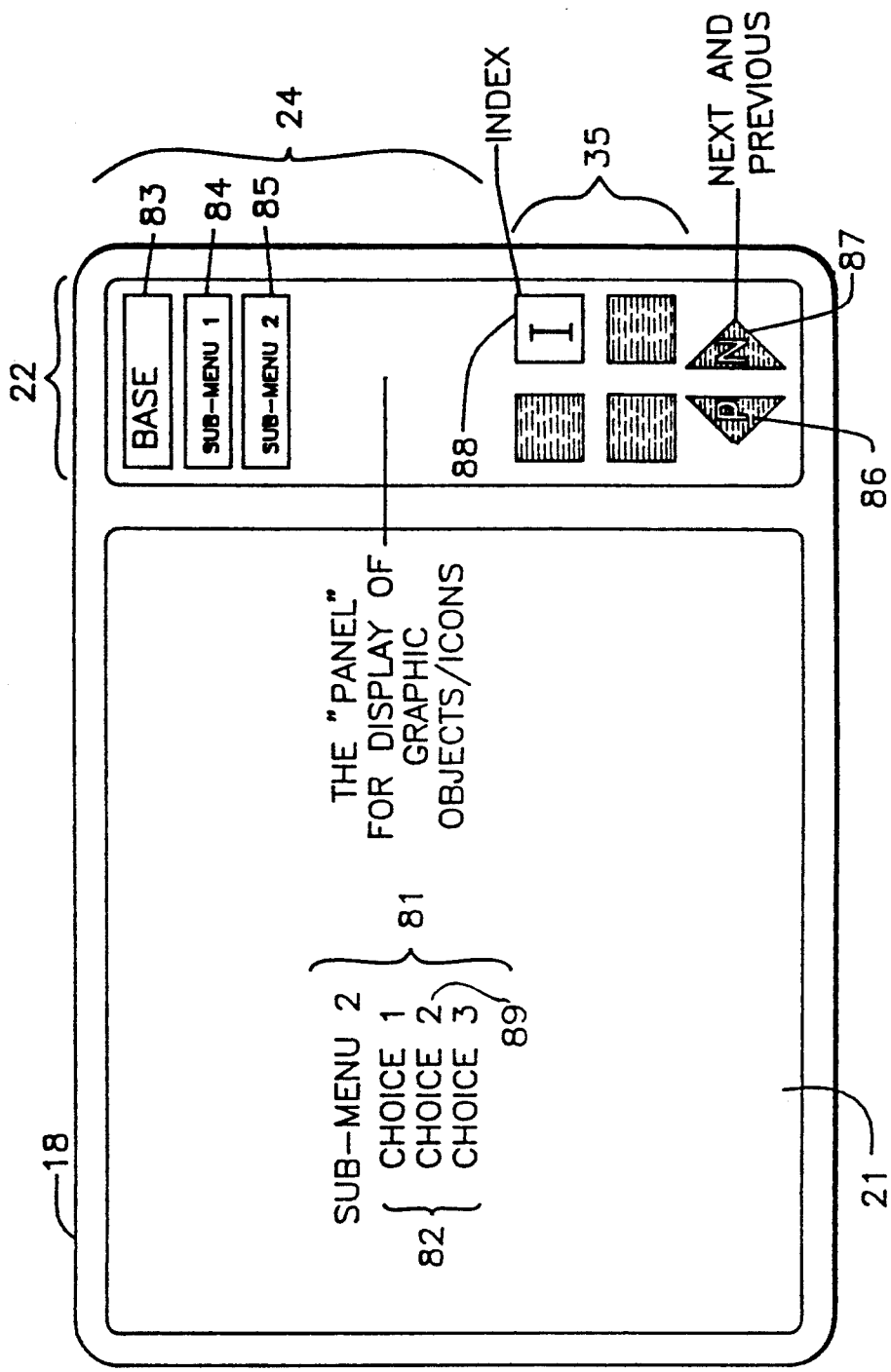
FIGS. 4a to 4d are examples of screen displays generated by the navigational tool of the present invention.

Referring now to FIG. 4a, there is illustrated the first of a series of four screen displays (FIGS. 4a to 4d) giving examples of the operation of the present invention. FIG. 4a shows a screen display 18 after a user has been operating the navigational tool. The information screen 21 shows a sub-menu called Sub-Menu 2 81, which gives the user three choices 82. The user has the option of selecting one of these three choices 82 to change the display on the information screen 21 to display information at a lower level in the information hierarchy. For example, the user may select Choice 2 89, which will cause information on topic Choice 2 to be displayed. The first segment 24 of the navigation panel 22 shows the path the user has traversed to reach the present state of the screen display shown in FIG. 4a. The user started with a Base screen (not shown), represented by the node icon labelled Base 83. This Base screen is the main menu generated by the startup module 51. From there the user selected from the Base screen a screen called Sub-Menu 1 (not shown) represented in the navigation panel 22 by the node icon Sub-Menu 1 84. The user then selected Sub-Menu 2 81 from Sub-Menu 1. The current display on the information screen 21, Sub-Menu 2 81, is represented by the node icon labelled Sub-Menu 2 85 in the navigation panel 22.

In this example, when an icon is available to be selected, it is colored white with black letters. When it is unavailable to be selected, it is colored gray. As there are no other units of information at the same level as Sub Menu 2 81, the Previous icon 86 and the Next icon 87 that are used to move to other units of information for this node are unavailable and are displayed in gray. In the third segment 35 of the navigation panel 22, only the index icon 88 is displayed as there are no special programming features related to Sub-Menu 2 81. At this stage, the access mechanism is the browse mechanism.

Figure 4B:
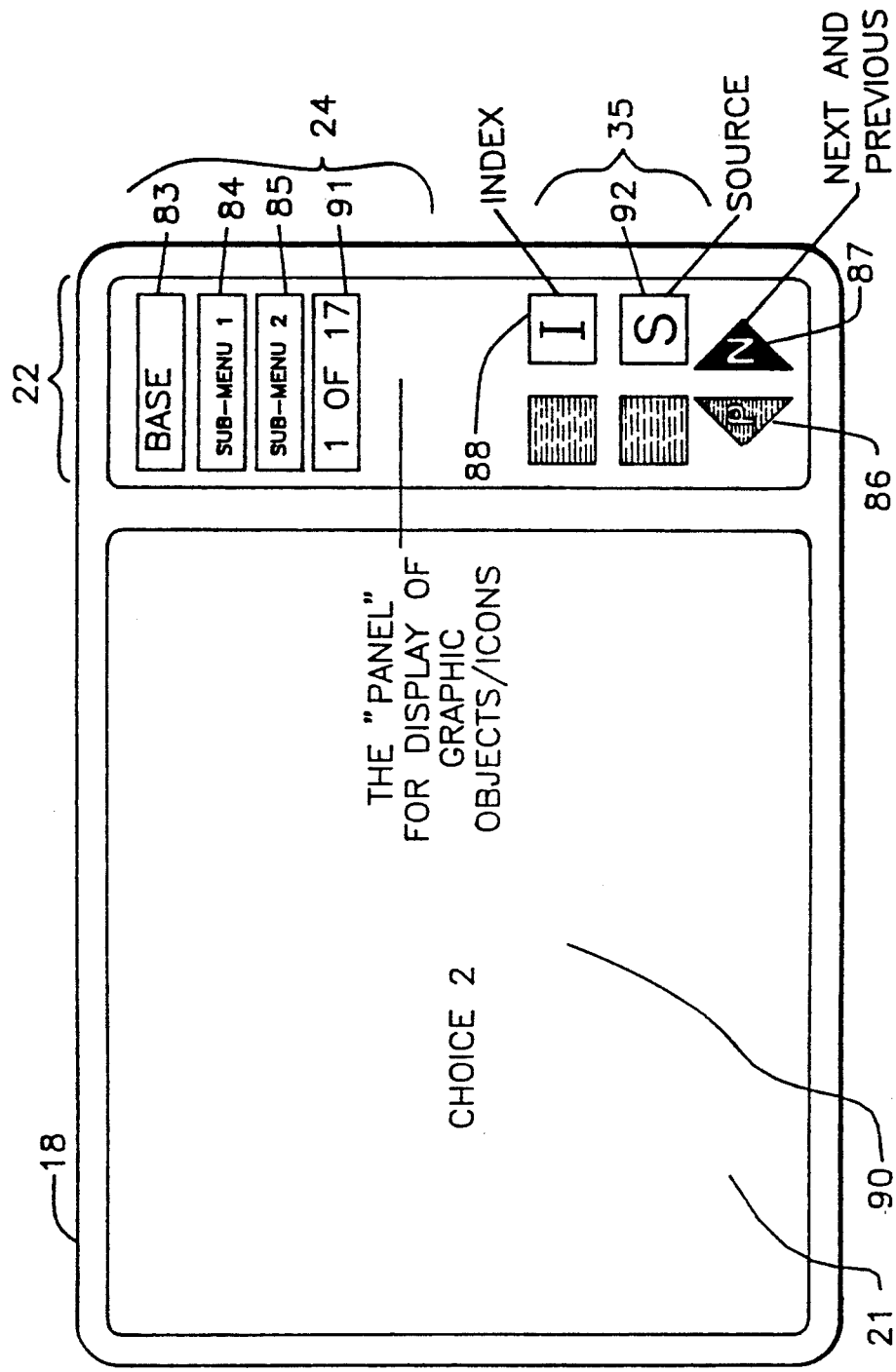

FIG. 4b shows the state of the screen display 18 after the user has selected Choice 2 89 from FIG. 4a. The Choice 2 information 90 is shown in FIG. 4b displayed on the information screen 21. The first segment 24 of the navigation panel 22 has been updated to include a node icon to represent the Choice 2 information 90. This new node icon 91 is labelled "1 of 17", which tells the user that there are seventeen units of information for this node and that the information currently displayed is unit of information one. The Next icon 87 is now available to the user for moving forward through those seventeen units of information. The Previous icon 86 is unavailable and thus is displayed in gray as one can not select a previous unit of information when the first unit of information is displayed. A source icon 92 is displayed in the third segment 35 of the navigation panel 22. The user has the choice of selecting the source icon 92 to have source information about Choice 2 90 displayed. A user also has the choice of accessing the index of information by selecting the index icon 88. As always, a user can return to previous screens, such as Sub-Menu 2 81, by selecting one of the three node icons 83, 84, 85 in the first segment 24 of the navigation panel 22.

Figure 4C:
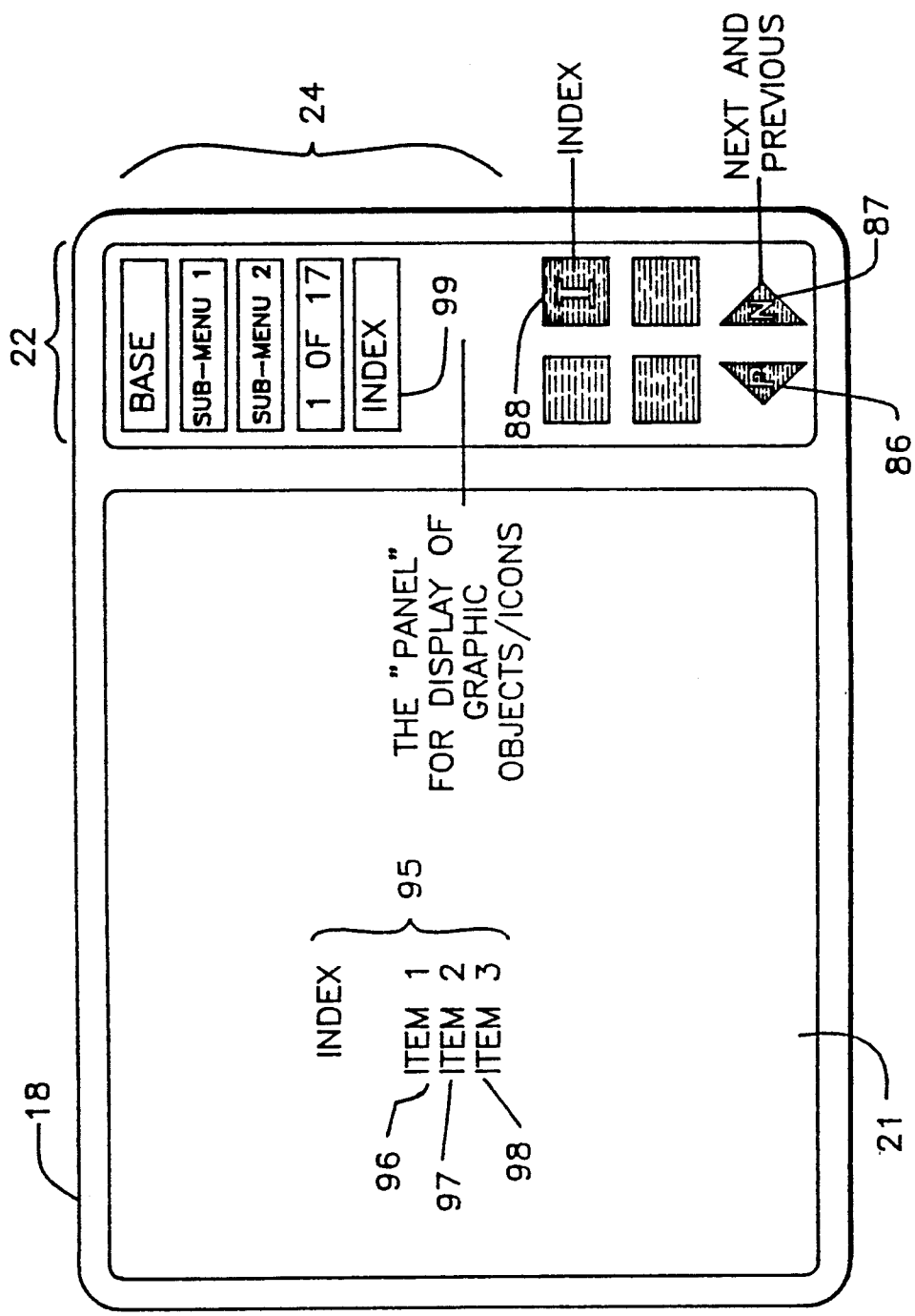

FIG. 4c shows the screen display 18 after the user has selected the index icon 88 from the screen shown in FIG. 4b. The screen display 18 shows the topic index 95 which includes three items 96, 97 and 98. The source icon 92 from FIG. 4b is no longer displayed, as source information is not available for this topic index 95. Also, it can be seen that no other units of information exist at this level as the Next icon 87 and Previous icon 86 are shown in gray. The first segment 24 of the navigation panel 22 has been updated to show an index node 99 as the current node icon 25. The access mechanism is still the browse mechanism.

Figure 4D:
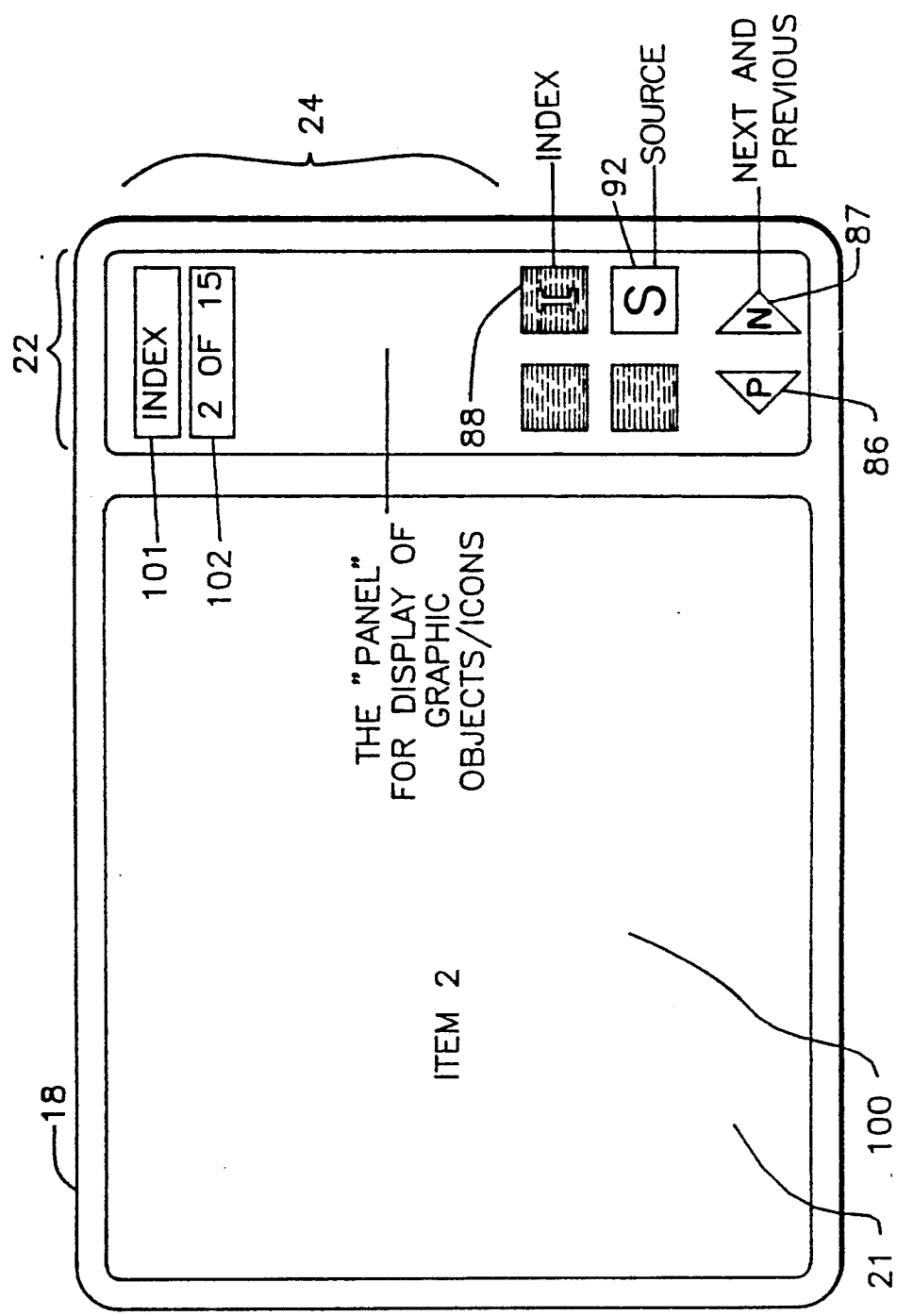

FIG. 4d shows the screen display 18 immediately after the user has selected Item 2 97 from FIG. 4c. The screen display 18 shows Item 2 100. The first segment 24 of the navigation panel 22 displays a different sequence of nodes 24. First in the sequence is a node icon 101 labelled "Index . . . " representing the topic index 95 of FIG. 4a. This may be selected to return to the screen display 18 shown in FIG. 4c. The second node 102, labelled "2 of 15" represents Item 2 100 (which is displayed on the information screen 21) and informs the user that there are fifteen units of information for this node and that the unit of information currently displayed is unit of information two. The Previous icon 86 and Next icon 87 are available to move backwards and forwards through the units of information for this node. The access mechanism is now the index mechanism. The user may return to the browse mechanism by selecting the node icon 34 labelled " . . . Index" 101. The index icon 88 is displayed in gray, meaning it cannot be selected from this screen. If the user wishes to return to the topic index 95, the node icon 34 labelled " . . . Index" 101 can be selected. As source information is available on Item 2 100, the source icon 92 is displayed.

APPENDIX

Pseudo code: (comments are indicated with "--")

```
-- startUp message is sent when program is first opened
on startUp
        -- initialize program state, show knowledge base with top level menu
        -- open first knowledge base screen
        global level, pathList, indexLevel, indexList, indexMode, indexReturn
        global quizMenu, reviewFromQuiz, quizLevel
        -- top level is 1, deeper levels increase value
        put 1 into level
        put 1 into indexLevel
        put "no" into indexMode
        put "no" into indexReturn
        put "yes" into quizMenu
        put "no" into reviewFromQuiz
        put 0 into quizLevel
        -- show navigation panel
        open wd "panel"
        -- initialize "panel"
        -- open array for collection of screen names visited during browse mode
        pathList = (,,,,,,,,,)
        put top level screen name into array(1)
        put top level screen name into top level icon
        -- open array for collection of screen names visited during index mode
        indexList = (,,,,,,,,,)
end startUp -- Pointer Actions -- PointerEnter actions generally cause information to appear
```

-- temporarily; the state of the knowledge base remains the same;
-- the basic screen does not change; and the information is hidden with
-- a pointerLeave action
on pointerEnter
    wait 8 ticks -- wait to determine if positioning is deliberate
    if within(me, pointerloc()) then -- check to see if printer is still there
        ojectInfoShow -- issue objectInfoShow message
    end if
end pointerEnter on pointerClick
    ojectClick -- issue objectClick message
end pointerClick on pointerLeave
    objectInfoHide -- issue objectInfoHide message
end pointerLeave -- Pointer generated messages on objectInfoShow -- issued with a pointerEnter action
    get the name of the target -- determine the target of the message
    put it into whatInfo
    if exists whatInfo & Chunk then   -- if this chunk of information
        show whatInfo & Chunk         -- exists in the knowledge base
    else                              -- then show it
        exit objectInfoShow
end objectInfoShow on objectInfoHide -- issued with a pointerLeave action
    get the name of the target -- determine the target of the message
    put it into whatInfo
    if exists whatInfo & Chunk then -- if this chunk of information
        hide whatInfo & Chunk       -- exists in the knowledge base
    else                            -- and is visible, then hide it
        exit objectInfoHide
end objectInfoHide on objectClick -- issued with a pointerClick action -- determine the target of the message and issue appropriate message
-- directly to that target if the target is panelIcon then
        navigate     -- navigate message
    end if
    if the target is menuItem then
        menuChoice   -- menuChoice message
    end if
    if the target is nextIcon then
        nextScreen   -- nextScreen message
    end if
    if the target is previousIcon then

```
            previousScreen  -- previousScreen message
        end if
        if the target is indexIcon then
            indexMode  -- indexMode message; enter index mode
        end if -- the following ojbjectClicks are included as examples of additional icons if the target is helpIcon then
            helpScreen
        end if
        if the target is glossaryIcon then
on menuChoice -- issued with pointerClick action on a menu item
        go to screen choice -- go to new node indicated by òchoiceò
        -- issue message to indicate a change in level and node
        deeperLevel
end menuChoice on nextScreen
        go to next screen
        -- issue message to indicate change in screen but no change in node
        sameLevel
end nextScreen on previousScreen
        go to previous screen
        -- issue message to indicate change in screen but no change in node
        sameLevel
end previousScreen on deeperlevel -- issue to software engine to maintain panel state
        global level, pathList, indexLevel, indexList, indexMode
        -- change of screen and change of node
        if indexMode is "no" then -- check for index mode
            put (level + 1) into level -- increase level by 1
            -- show additional panel icon
            put the short name of this cd into cd fld level of cd 1 of wd panel
            show cd fld level of cd 1 of wd panel
            put the long id of this cd into item level of pathList
        else
            -- operations for index mode parallel those for browse mode
            put (indexlevel + 1) into indexlevel
            show cd fld indexlevel of cd 1 of wd indexpanel
            put the long id of this cd into item indexlevel of indexList
        end if
end deeperlevel on samelevel -- issue to software engine to maintain panel state
        -- change of screen but no change of node
        global level, pathList, indexLevel, indexList, indexMode
        if indexMode = "no" then
            -- set name of panel icon to current screen
```

```
        put the short name of this cd into cd fld level of cd 1 of wd panel
        put the long id of this cd into item level of pathList
    else
        put the short name of this cd into cd fld indexlevel of cd 1 of wd
             indexpanel
        put the long id of this cd into item indexlevel of indexList
    end if end samelevel
```

What is claimed is:

1. A navigational tool for traversing information units stored in a memory of a computer system, the computer system having a monitor and operating according to a preselected application program, the navigational tool comprising:

a first module for independently tracking a path traversed by the computer system under the control of the application program through the memory, generating a sequence of nodes, each representative of one level of the path followed by the computer system under the control of the application program and organizing the nodes into a hierarchical representation of the path;

a second module for displaying the sequence of nodes on the monitor simultaneously with a display generated by the application program;

the first module operating to continuously update the sequence of nodes as the computer system continues to independently traverse the memory under the control of the application program;

the second module operating to display on the monitor, the updated sequence of nodes simultaneously with a display generated by the application program;

a control device coupled to the monitor for controllably selecting any one of the sequence of nodes displayed on the monitor; and a third module responsive to the selection of a node by the control device to redirect the traversal of the computer system to the level of the path represented by the selected node.

2. The navigational tool of claim 1, further comprising an index mechanism, selectable by the control device, for displaying on the monitor a topic index of the information units stored in the memory.

3. The navigational tool of claim 2 wherein each topic displayed in the topic index is further selectable by the control device.

4. The navigational tool of claim 3, further comprising
a fourth module, responsive to the selection of a topic by the control device, to redirect traversal of the computer system to the information unit of the selected topic,
the fourth module causing the second module to replace the sequence of nodes displayed with an index sequence of nodes, the first node in the index sequence of nodes representative of the topic index, each subsequent node in the index sequence of nodes representative of one level of the path followed by the computer system subsequent to the selection of a topic from the topic index.

5. The navigational tool of claim 2 wherein the index mechanism is an index icon.

6. The navigational tool of claim 4 wherein the third module is responsive to the selection of the first node in the index sequence of nodes by returning to the operational state of the computer system immediately prior to the selection of the index mechanism.

7. The navigational tool of claim 1 wherein each level of the path comprises a plurality of units of information, each unit of information represented by a unit number.

8. The navigational tool of claim 7 wherein the display generated by the application program comprises a display of one unit of information.

9. The navigational tool of claim 8 wherein the node representative of the level currently displayed by the application program further includes an indication of the total number of units of information for each level and the unit of information currently displayed on the monitor.

10. The navigational tool of claim 9 further comprising a next mechanism, selectable by the control device, for displaying on the monitor the unit of information having a unit number one greater than the unit of information currently displayed.

11. The navigational tool of claim 10 wherein the next mechanism is a next icon.

12. The navigational tool of claim 9 further comprising a previous mechanism, selectable by the control device, for displaying on the monitor the unit of information having a unit number one less than the unit of information currently displayed.

13. The navigational tool of claim 12 wherein the previous mechanism is a previous icon.

14. The navigational tool of claim 1 wherein the control device is a mouse.

15. The navigational tool of claim 1, wherein each node comprises an identifier of the level of information that is represented by the node.

16. The navigational tool of claim 1 wherein the second module further displays a plurality of special features icons selectable by the control device, each one of the plurality of special features icons representing a function executable by the application program.

17. The navigational tool of claim 16 wherein the selection of one of the plurality of special features icons causes the application program to execute the represented function.

18. The navigational tool of claim 16 wherein the function represented by each one of the plurality of special features icons is a function of the display currently generated by the application program.

19. The navigational tool of claim 18 wherein the special features icons include a help icon, a graphic icon, a play movie icon and a quiz icon.

20. The navigational tool of claim 1 wherein a first node in the sequence of nodes is representative of a main menu of the application program.

21. The navigational tool of claim 1 wherein a last node in the sequence of nodes is representative of the display currently generated by the application program.

22. The navigational tool of claim 1 wherein the application program is a multi-media knowledge base program.

23. The navigational tool of claim 1 wherein the application program is a data-base program.

24. A method for traversing information units stored in a memory of a computer system, the computer system having a monitor and operating according to a preselected application program, the method comprising the steps of:
- independently tracking a path traversed by the computer system under the control of the application program through the memory;
- generating a sequence of nodes, each representative of one level of the path followed by the computer system under the control of the program;
- organizing the nodes into a hierarchical representation of the path;
- displaying the sequence of nodes on the monitor simultaneously with a display generated by the application program;
- operating to continuously update the sequence of nodes as the computer system continues to independently traverse the memory under the control of the application program;
- controllably selecting any one of the sequence of nodes displayed on the monitor; and
- thereafter redirecting the traversal of the computer system to the level of the path represented by the selected node.

25. The method of claim 24, further comprising the steps of:
- operating to display on the monitor an index icon;
- controllably selecting the index icon; and thereafter displaying on the monitor a topic index of the information units stored in the memory.

26. The method of claim 25, further comprising the steps of:
- controllably selecting a topic from the topic index;
- thereafter redirecting traversal of the computer system to the information unit of the selected topic; and
- replacing the sequence of nodes displayed with an index sequence of nodes, the first node in the index sequence of nodes representative of the topic index, each subsequent node in the index sequence of nodes representative of one level of the path followed by the computer system subsequent to the selection of a topic from the topic index.

27. The method of claim 26, further comprising the steps of:
- controllably selecting the first node in the index sequence of nodes; and
- thereafter returning to the operational state of the computer system immediately prior to the selection of the index icon.

* * * * *

UNITED STATES PATENT AND TRADEMARK OFFICE
CERTIFICATE OF CORRECTION

PATENT NO. : 5,297,253
DATED : March 22, 1994
INVENTOR(S) : Mark L. Meisel

It is certified that error appears in the above-indentified patent and that said Letters Patent is hereby corrected as shown below:

On the title page, change the inventor's name from "Leslie M. Meisel" to -- Mark L. Meisel --.

Signed and Sealed this

Thirty-first Day of May, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,297,253
DATED : March 22, 1994
INVENTOR(S) : Leslie M. Meisel

It is certified that error appears in the above-indentified patent and that said Letters Patent is hereby corrected as shown below:

Column 17, line 10 after "if the target is glossaryIcon then" an entire page of the Appendix was left out.

Signed and Sealed this

Fourth Day of October, 1994

Attest:

BRUCE LEHMAN

Attesting Officer

Commissioner of Patents and Trademarks

```
        glossaryScreen
    end if
    if the target is graphicIcon then
        graphicScreen
    end if end objectClick -- Messages for screen objects on navigate -- issued with pointerClick action on panel icon
        global level, pathList, indexLevel, indexList, indexMode
        get the number of the target
        put it into newlevel
        if indexMode = "no" then -- test for indexmode
            if newlevel < level then -- test for level less than current level
                -- remove screen names from panel button up to new level
                -- remove screen names from pathList array up to new level
                    repeat with i = (newlevel + 1) to level
                            put "" into cd fld i of cd 1 of wd "panel"
                            hide cd fld i of cd 1 of wd "panel"
                            put "" into item i of pathList
                    end repeat
                -- get the name of the desired destination card and go to it
                    get item newlevel of pathList
                    put it into destination
                -- set the level back up to the level for the new node
                    put newlevel into level
                    send ("go to" & destinatioN) to topwindow()
            end if
        else    -- operations for index mode parallel browse mode
                -- index mode allows direct access of any information screen
                -- in knowledge base from listing of topics
            if newlevel < indexlevel then
                    repeat with i = indexlevel down to (newlevel + 1)
                            put "" into cd fld i of cd 1 of wd "indexpanel"
                            hide cd fld of cd 1 of wd "indexpanel"
                            put "" into item i of indexList
                    end repeat
                    get item newlevel of indexList
                    put it into destination
                    put newlevel into indexlevel
                    send ("go to" & destination) to topwindow()
            end if
        end if
end navigate
```